(12) United States Patent
Dabak

(10) Patent No.: US 11,385,918 B2
(45) Date of Patent: Jul. 12, 2022

(54) DYNAMIC DISCOVERY OF INTERNAL KERNEL FUNCTIONS AND GLOBAL DATA

(71) Applicant: VMWARE, INC., Palo Alto, CA (US)

(72) Inventor: Prasad Dabak, Pune (IN)

(73) Assignee: VMWARE, INC., Palo Alto, CA (US)

(*) Notice: Subject to any disclaimer, the term of this patent is extended or adjusted under 35 U.S.C. 154(b) by 88 days.

(21) Appl. No.: 16/396,803

(22) Filed: Apr. 29, 2019

(65) Prior Publication Data
US 2020/0233686 A1 Jul. 23, 2020

(30) Foreign Application Priority Data
Jan. 23, 2019 (IN) .............................. 201941002756

(51) Int. Cl.
| | | |
|---|---|---|
| G06F 9/455 | (2018.01) | |
| G06F 9/54 | (2006.01) | |
| G06F 9/30 | (2018.01) | |
| G06F 8/41 | (2018.01) | |
| G06F 8/53 | (2018.01) | |

(52) U.S. Cl.
CPC .......... G06F 9/45554 (2013.01); G06F 8/427 (2013.01); G06F 8/53 (2013.01); G06F 9/30043 (2013.01); G06F 9/30101 (2013.01); G06F 9/45545 (2013.01); G06F 9/545 (2013.01)

(58) Field of Classification Search
None
See application file for complete search history.

(56) References Cited

U.S. PATENT DOCUMENTS

| | | | | |
|---|---|---|---|---|
| 8,479,188 | B2* | 7/2013 | Singh | G06F 21/577 717/168 |
| 9,274,823 | B1* | 3/2016 | Koryakin | G06F 9/45545 |
| 10,203,968 | B1* | 2/2019 | Lawson | G06F 8/54 |
| 2012/0198428 | A1* | 8/2012 | Schmidt | G06F 9/30174 717/153 |
| 2013/0117530 | A1* | 5/2013 | Kim | G06F 9/45558 711/206 |
| 2014/0122454 | A1* | 5/2014 | Brylyn | G06F 16/93 707/705 |
| 2014/0181976 | A1* | 6/2014 | Snow | G06F 21/566 726/23 |
| 2015/0033227 | A1* | 1/2015 | Lin | G06F 9/45558 718/1 |
| 2015/0332043 | A1* | 11/2015 | Russello | G06F 21/52 726/23 |
| 2016/0048679 | A1* | 2/2016 | Lutas | G06F 12/1027 726/23 |
| 2016/0283260 | A1* | 9/2016 | Bacher | G06F 9/45545 |
| 2017/0116108 | A1* | 4/2017 | Miskelly | G06F 11/3624 |
| 2018/0060249 | A1* | 3/2018 | Tsirkin | G06F 9/445 |

(Continued)

*Primary Examiner* — Abu Zar Ghaffari
(74) *Attorney, Agent, or Firm* — Su IP Consulting

(57) ABSTRACT

A method is provided for a hypervisor to dynamically discover internal address information of a guest kernel on a virtual machine. The method includes locating a kernel exported system call or function in an image of the guest kernel in guest memory of the virtual machine, disassembling machine code of the kernel exported system call or function in the image into assembly code, detecting a pattern from memory references in the assembly code, and, after detecting the pattern, determining the internal address information of the guest kernel from the assembly code.

24 Claims, 7 Drawing Sheets

(56) References Cited

U.S. PATENT DOCUMENTS

2018/0267818 A1    9/2018  Dabak et al.
2018/0267819 A1    9/2018  Dabak et al.
2019/0347125 A1*  11/2019  Sankaran ............ G06F 9/30014

* cited by examiner

DYNAMIC DISCOVERY OF INTERNAL KERNEL FUNCTIONS AND GLOBAL DATA

CROSS-REFERENCE TO RELATED APPLICATION

Benefit is claimed under 35 U.S.C. 119(a)-(d) to Foreign Application Serial No. 201941002756 filed in India entitled "DYNAMIC DISCOVERY OF INTERNAL KERNEL FUNCTIONS AND GLOBAL DATA", on Jan. 23, 2019, by VMWARE, INC., which is herein incorporated in its entirety by reference for all purposes.

BACKGROUND

One challenge in implementing hypervisor-based security protection for a guest operating system (OS) in a virtual machine (VM) is the lack of guest OS context. At the hypervisor layer, raw guest memory can be accessed but it is non-trivial to decode the memory to determine where the guest OS is keeping internal data structures such as process list, thread list, system call table, internal locks, global internal variables/data and so on. It is also difficult to find out offsets of various fields in a data structure since the offsets could change from one version of the guest OS to another. Further, it is desirable for the hypervisor to gain control when the guest kernel is executing certain internal functions. However, it is non-trivial to decode the raw guest memory to find the addresses of these internal functions. Modern OS security techniques like address space randomization (ASLR) make it even more difficult to decode the raw guest memory.

BRIEF DESCRIPTION OF THE DRAWINGS

FIG. 2-1 illustrates a mapped memory image of a guest kernel (e.g., ntoskrnl.exe in Windows) of FIG. 1 in some examples of the present disclosure.

FIGS. 2-2, 2-3, and 2-4 illustrate various ways for locating addresses of system calls in some examples of the present disclosure.

FIG. 3 is a block diagram illustrating a flowchart of a method for an instrumentation in the virtual machine introspection (VMI) module of FIG. 1 to dynamically discover an internal function or global data of interest by matching a pattern against memory references from the memory image of the guest kernel of FIG. 1 in some examples of the present disclosure.

FIG. 4 is a block diagram illustrating a flowchart of a method for first or second instrumentation in the VMI module of FIG. 1 to dynamically determine the address of an internal global data of interest by locating an exported reference that calls another exported reference and passes it the internal global data as a parameter in some examples of the present disclosure.

DETAILED DESCRIPTION

Figure 1:
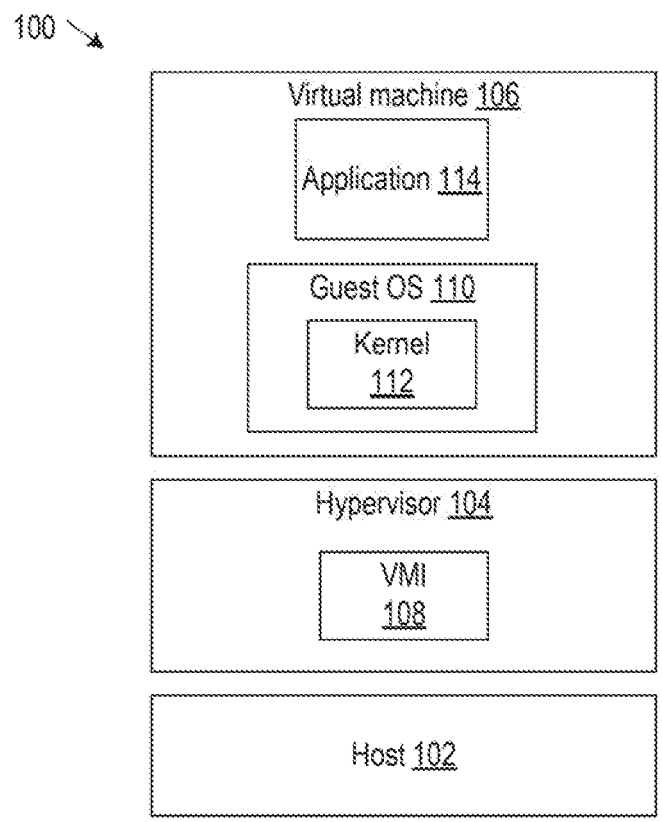
FIG. 1 is a block diagram of a virtualized computing environment in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 is a block diagram of a virtualized computing environment 100 in examples of the present disclosure. Environment 100 includes a host computer 102, also referred to as a host. Host 102 may include hardware such as physical memory, processor, local storage, and network interface cards. Host 102 runs a hypervisor 104 to create and run at least one virtual machine (VM) 106. Hypervisor 104 includes virtual machine introspection (VMI) module 108 for monitoring VM 106.

VM 106 represents a software implementation of a physical machine. Hypervisor allocate virtual resources to VM 106 to support a guest operating system (OS) 110 with a guest kernel 112 running on the VM and at least one guest application 114 running on the guest OS. The virtual resources may include virtual (guest) memory, virtual processor, virtual local storage, and virtual network interface cards. Guest OS 110 may be implemented using any suitable operating system, such as Microsoft Windows, Linux, etc.

Guest kernel 112 typically exports functionality in the form of (1) system calls for user and kernel modes, and (2) exported functions and global data for the kernel mode. For example, the NTOSKRNL.EXE kernel on the Windows platform exports 400+ system calls and 2000+ exported function and global data.

Figures 1, 2:
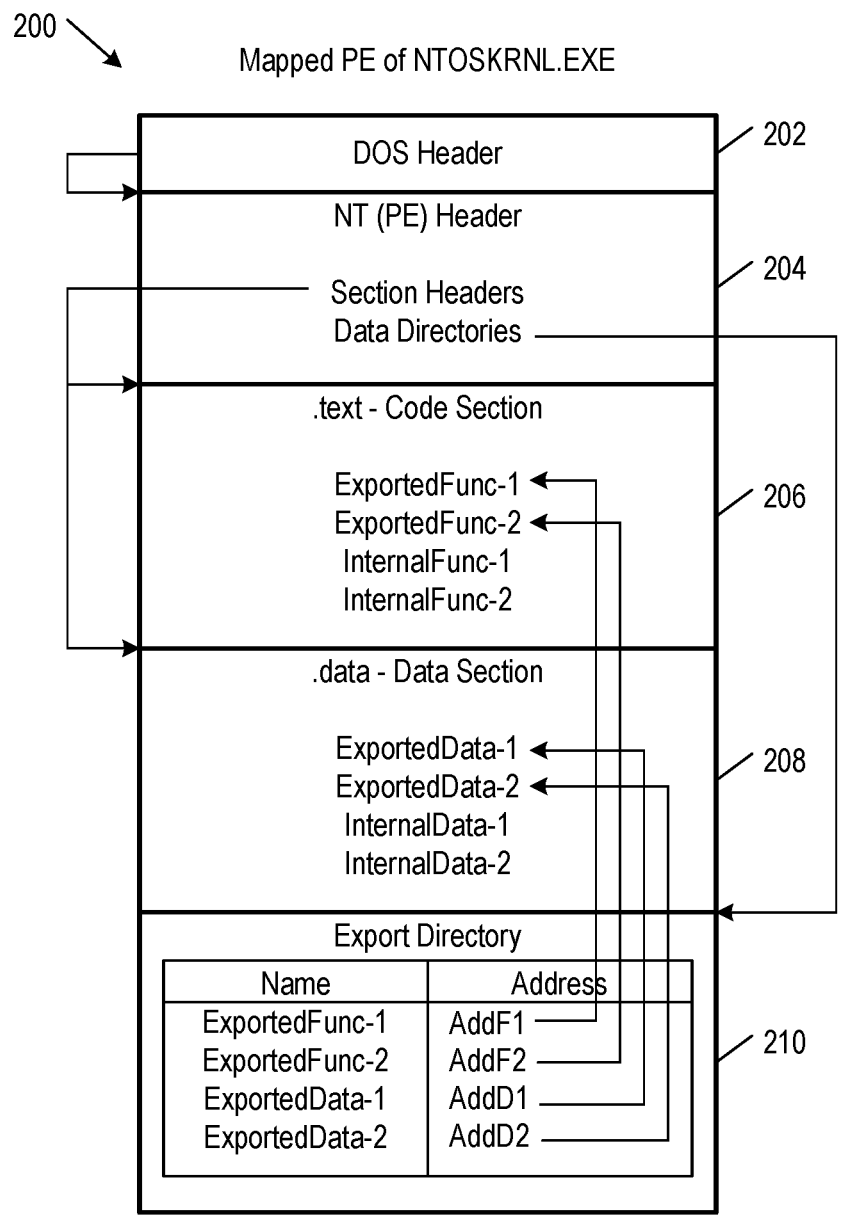
Figure 2:
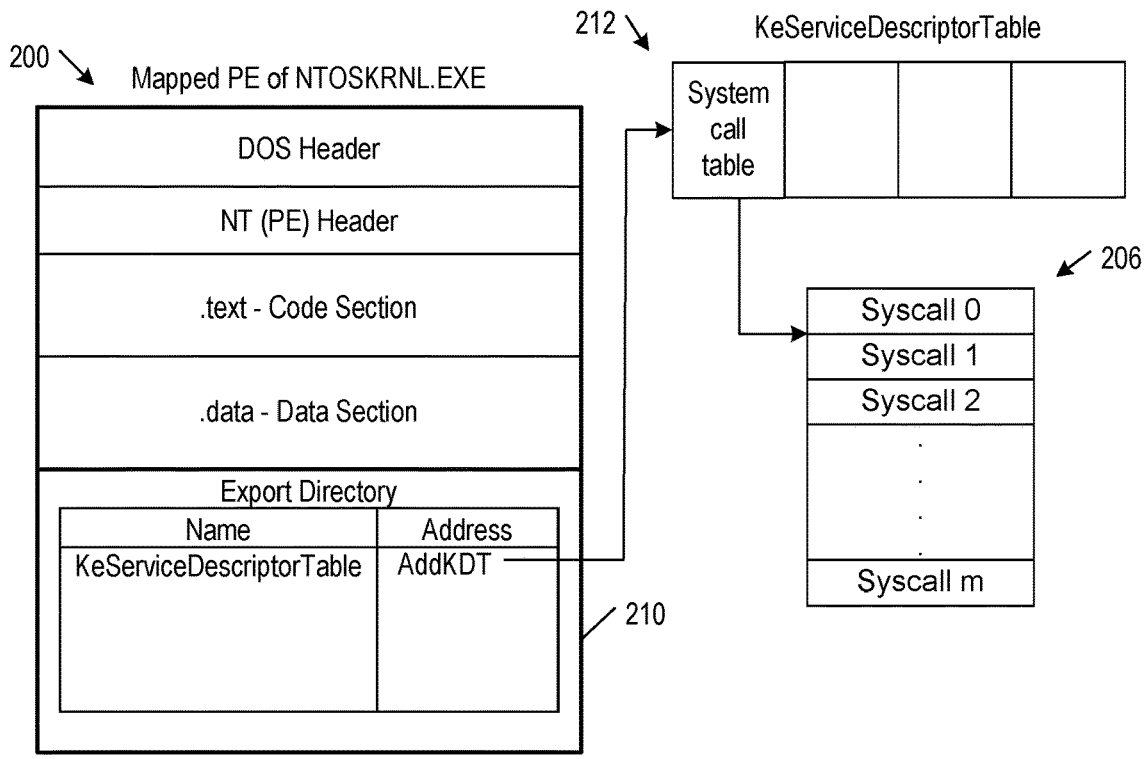

FIG. 2-1 illustrates a mapped memory image 200 of guest kernel 112 (FIG. 1) in some examples of the present disclosure. For example, guest kernel image 200 may conform to the Portable Executable (PE) format for a Windows OS or another format for a different OS. Guest kernel image 200 includes a DOS header 202, an NT (PE) header 204, a code section 206, a data section 208, and an export directory 210. VMI module 108 in hypervisor 104 may first find DOS header 302 and follow a pointer to NT (PE) header 204, which stores the guest kernel's base address and size that identify the mapped kernel address space. NT (PE) header 204 includes section headers and data directories. VMI module 108 may follow pointers in the section headers to code section 206 and data section 208. VMI module 108 may follow a pointer in the data directories to export directory 210. The export directory 210 includes an export table. VMI module 108 may follow addresses for exported functions (e.g., ExportedFun-1 and ExpotedFun-2) to their code in code section 206. VMI module 108 may follow addresses for exported data (e.g., ExportedData-1 and ExpotedData-2) to their values in data section 208.

Figures 2, 3:
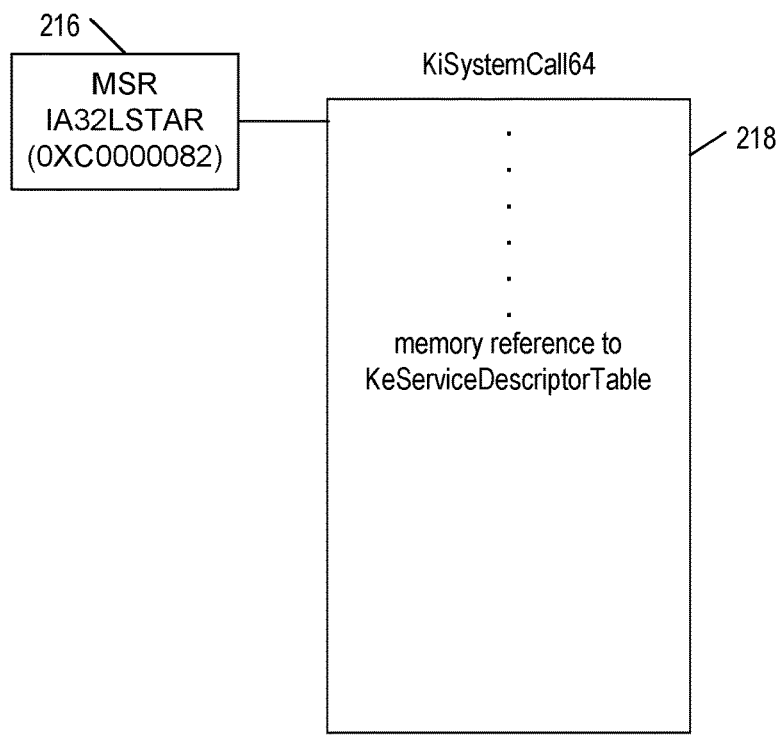
Figures 2, 3, 4:
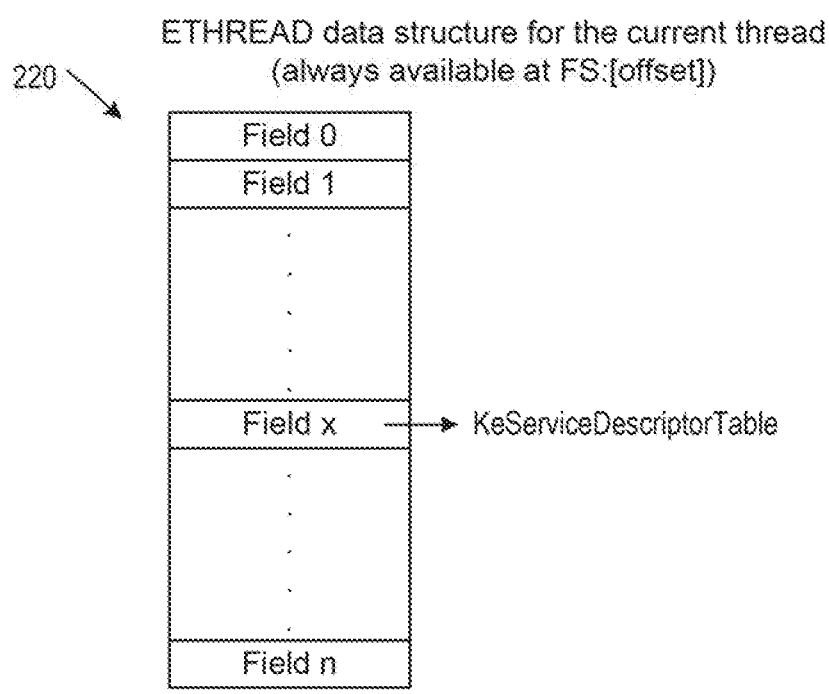
Figure 3:
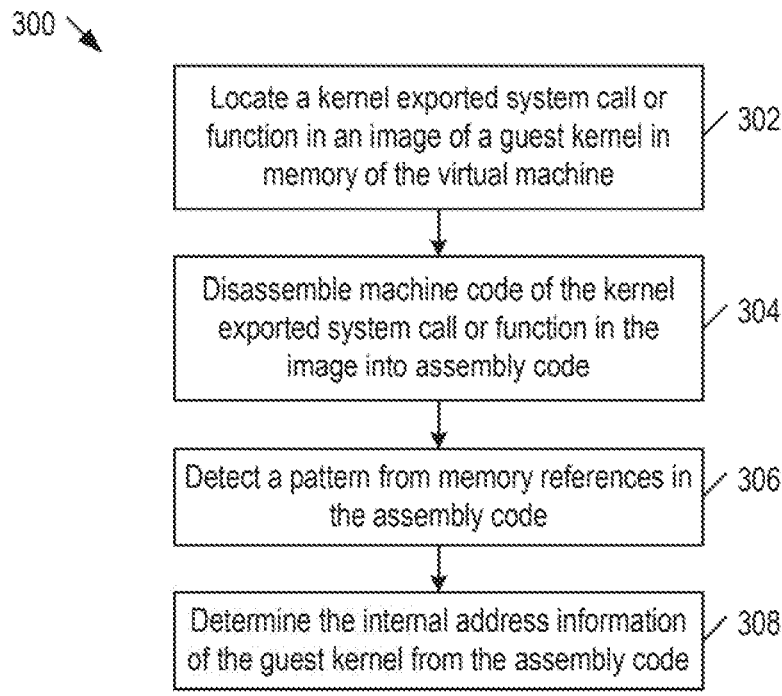
Figure 4:
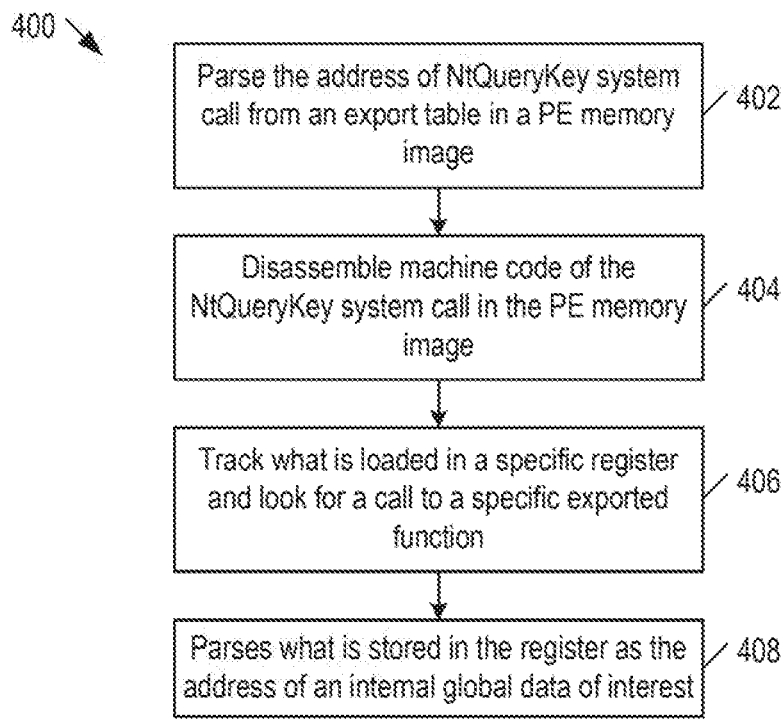

FIGS. 2-2, 2-3, and 2-4 illustrate various ways for locating addresses of system calls in some examples of the present disclosure. In FIG. 2-2, VMI module 108 may follow references of certain exported global data, such as KeServiceDescriptorTable, in export directory 210 to a system call table 212. From system call table 212, VMI module 108 may follow addresses for the system calls to their code in code section 206 (for clarity illustrated outside of guest kernel image 200). This is typically possible when the guest kernel may be a version of 32-bit Windows.

In FIG. 2-3, VMI module 108 may determine the addresses for the system calls from model specific registers (MSR) 216 to reach a system call handler function 218 such as KiSystemCall64. VMI module 108 then disassemble function 218 to find a memory reference, such as KeServiceDescriptorTable 212 (FIG. 2-2), and follow the reference to system call table 212 (FIG. 2-2).

In FIG. 2-4, VMI module 108 may determine the address for the system calls through an accessible data structure 220, such as an ETHREAD data structure for the current thread. ETHREAD data structure 220 is available at a fixed offset relative to FS register. Alternatively, there is also an exported function KeGetCurrentThread that gives a pointer to ETHREAD data structure 220 for the current thread. In ETHREAD data structure 220, VMI module 108 finds a pointer to KeServiceDescriptorTable 212 (FIG. 2-2) at a known offset. This is typically possible when the guest kernel is a version of 32-bit Windows.

Guest kernel 112 also has thousands of internal functions and global data. Unlike system calls, exported functions, and exported global data, the internal functions and global data cannot be discovered by walking the system call table and the export table in the PE image of guest kernel 112.

In examples of the present disclosure, method and apparatus are provided for a hypervisor to dynamically discover certain internal functions and global data of interest in a guest OS kernel in a virtual machine (VM). In some examples of the present disclosure, a tool disassembles the machine code of at least one kernel system call or exported function in the PE disk image of the OS kernel. The tool uses a program database (PDB) file to produce assembly code annotated with the names of system calls, functions, and variables. A computer engineer examines the assembly to find at least one internal function or global data (including internal data structures) of interest. For the internal functions or global data of interest, the computer engineer determines a pattern that identifies the internal function or global data from memory references in the assembly code. In some examples of the present disclosure, the computer engineer then creates an instrumentation in VMI module 106 (FIG. 1) to dynamically discover the internal function or global data of interest by matching the pattern against memory references from the PE memory image of guest kernel 112. Both the tool and the instrumentation may be based on an open source disassembler library, such as Capstone.

FIG. 3 is a block diagram illustrating a flowchart of a method 300 for an instrumentation in VMI module 108 (FIG. 1) to dynamically discover an internal function or global data of interest by matching a pattern against memory references from the PE memory image of guest kernel 112 (FIG. 1) in some examples of the present disclosure. Method 300, and any method described herein, may be implemented as instructions encoded on a computer-readable medium that is to be executed by a processor in a computer system. Method 300, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 300 may begin in block 302.

In block 302, the instrumentation locates a kernel exported system call or function in image 200 (FIG. 2-1, 2-1, 2-3) of guest kernel 112 (FIG. 1) in guest memory of a virtual machine. Block 302 may be followed by block 304.

In block 304, the instrumentation disassembles machine code of the kernel exported system call or function in the image into assembly code. Block 304 may be followed by block 306.

In block 306, the instrumentation matches a pattern against memory references in the assembly code. When the instrumentation detects the pattern from the memory references, block 306 may be followed by block 308.

In block 308, the instrumentation determines the internal address information of guest kernel 112 from the assembly code.

First and Second Instrumentations

In some examples of the present disclosure, an instrumentation in VMI module 108 (FIG. 1) determines the address of an internal global data of interest by locating an exported reference (e.g., a system call having discoverable address) that calls another exported reference (e.g., an exported function having discoverable address) and passes it the internal global data as a parameter. Per the application binary interface (ABI) of guest kernel 112, the system call uses a specific register to pass the internal global data to the exported function. Thus, when the exported function is called, the value stored in this specific register is the address of the internal global data. More specifically, the instrumentation disassembles the system call or an exported function and tracks loading of the register followed by a call to the exported function. The instrumentation then looks at what was loaded in the register to determine the address of the internal global data.

To demonstrate this instrumentation, consider the disassembled code the exported "NtQueryKey" system call for querying a registry key listed in Table 1. This system call internally references a registry key object and later on checks if a registry lock is shared acquired.

TABLE 1

| NtQueryKey |
| --- |
| NtQueryKey @1402f4d40 of size 6cc |
| 0x1402f4e27: mov r8, qword ptr [CmKeyObjectType] |
| 0x1402f4e33: call ObReferenceObjectByHandleWithTag |
| .... |
| .... |
| 0x1402f5062: lea rcx, qword ptr [CmpRegistryLock] |
| 0x1402f5069: call ExIsResourceAcquiredSharedLite |

NtQueryKey is a system call so it can be discovered using the PE memory image of guest kernel 112. "ObReferenceObjectByHandleWithTag" and "ExIsResourceAcquiredSharedLite" are exported functions so they also can be discovered in the export table of the PE memory image.

"CmKeyObjectType" and "CmpRegistryLock" are internal global data that are cannot be easily discovered in the PE memory image.

A first instrumentation may be created to find the internal CmKeyObjectType global data, and a second instrumentation may be created to find the internal CmpRegistryLock global data. FIG. 4 is a block diagram illustrating a flowchart of a method 400 for the first or the second instrumentation in VMI module 108 (FIG. 1) to dynamically determine the address of an internal global data of interest by locating an exported reference (e.g., a system call) that calls another exported reference (e.g., an exported function having discoverable address) and passes it the internal global data as a parameter in some examples of the present disclosure. Method 400 may be a variation of method 300. Method 400 begins in block 402.

In block 402, the first or the second instrumentation locates a kernel exported system call or function in image 200 (FIG. 2-1) of guest kernel 112 (FIG. 1) in guest memory of a virtual machine. The first or the second instrumentation parses the address of the NtQueryKey system call from the system call table in the PE memory image 200. The first instrumentation is also configured to parse the address of the exported ObReferenceObjectByHandleWithTag function from the export table, and the second instrumentation is also configured to parse the exported ExIsResourceAcquiredSharedLite function from the export table. Block 402 corresponds to block 302 of method 300. Block 402 may be followed by block 404.

In block 404, starting from the address of the NtQueryKey system call determined in block 402, the first or the second instrumentation disassembles the machine code in the PE memory image 200 into assembly code. Block 402 corresponds to block 304 of method 300. Block 404 may be followed by block 406.

In block 406, the first or the second instrumentation matches a pattern against memory references in the assembly code. When the first or the instrumentation detects the corresponding pattern from the memory references, block 406 may be followed by block 408. As the first instrumentation disassembles the code of the NtQueryKey system call, it tracks what is loaded in the "R8" register and look for a call to the exported ObReferenceObjectByHandleWithTag function, which is identified by its address determined in block 402. As the second instrumentation disassembles the code of the NtQueryKey system call, it tracks what is loaded in the "RCX" register and look for a call to the exported ExIsResourceAcquiredSharedLite function, which is identified by its address determined in block 402. When the first instrumentation detects the call to the exported ObReferenceObjectByHandleWithTag function or the second instrumentation detects the call to the exported ExIsResourceAcquiredSharedLite function, block 406 may be followed by block 408. Block 406 corresponds to block 306 of method 300.

In block 408, the first or the second instrumentation determines the internal address information of guest kernel 112 from the assembly code. The first instrumentation parses what is stored in the R8 register as the address of the internal CmKeyObjectType global data. The second instrumentation parses what is stored in the RCX register as the address of the internal CmpRegistryLock global data. Block 408 corresponds to block 308 of method 300.

Third Instrumentation

In some examples of the present disclosure, an instrumentation in VMI module 108 (FIG. 1) determines the address of an internal function of interest by locating an exported reference (e.g., a system call having discoverable address) that calls an internal reference (e.g., an internal function) and passes it an exported reference (e.g., an exported global data having discoverable address) as a parameter. In such examples, the instrumentation discovers the address of the internal function by looking at what is being loaded in a specific register followed by a call to internal function.

To demonstrate this instrumentation, consider the disassembled code the kernel system call "NtSuspendProcess" for suspending a process listed in Table 2.

TABLE 2

NtSuspendProcess nt!NtSuspendProcess:
ffff805'4ce 17890 4c8bdc mov r11,rsp
ffff805'4ce 17893 53 push rbx
ffff805'4ce 17894 4883ec40 sub rsp,40h
ffff805'4ce 17898 65488b042588010000 mov rax,qword ptr gs:[188h]
ffff805'4ce178a1 ba00080000 mov edx,800h
ffff805'4ce 178a6 498363f000 and qword ptr [r11−10h],0
ffff805'4ce 178ab 498363e800 and qword ptr [r11−18h],0
ffff805'4ce178b0 4c8b05195acbff mov r8,qword ptr [nt!PsProcessType (ffff805'4cacd2d0)]
ffff805'4ce 178b7 448a8832020000 mov r9b,byte ptr [rax+232h]
ffff805'4ce178be 498d4310 lea rax,[r11+10h]
ffff805'4ce 178c2 498943e0 mov qword ptr [r11−20h],rax
ffff805'4ce 178c6 c7442420507355375 mov dword ptr [rsp+20h],75537350h
ffff805'4ce178ce e8edccd9ff call nt!ObpReferenceObjectByHandleWithTag (ffff805'4cbb45c0)
ffff805'4ce178d3 8bd8 mov ebx,eax NtSuspendProcess is a system call so it is easily discovered in the PE memory image of guest kernel 112. "PsProcessType" is an exported global data so it also can be discovered from the export table of the PE memory image. "ObpReferenceObjectByHandleWithTag" is an internal function that cannot be easily discovered in the PE memory image.

Figure 5:
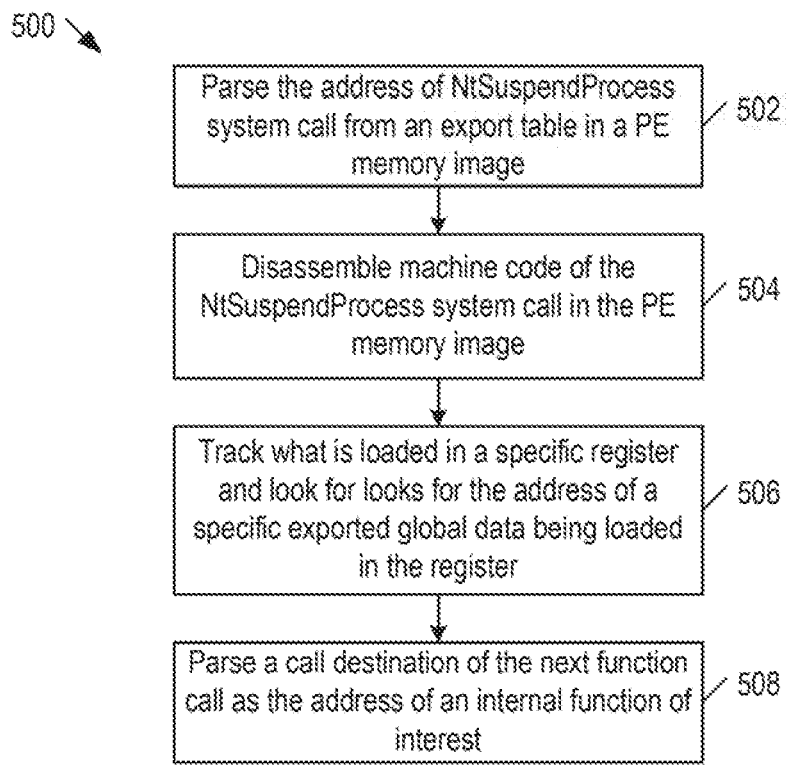
FIG. 5 is a block diagram illustrating a flowchart of a method for a third instrumentation in the VMI module of FIG. 1 to dynamically determine the address of an internal function of interest by locating an exported reference that calls an internal reference and passes it an exported reference as a parameter in some examples of the present disclosure.

A third instrumentation may be created to find the internal ObpReferenceObjectByHandleWithTag function. FIG. 5 is a block diagram illustrating a flowchart of a method 500 for the third instrumentation in VMI module 108 (FIG. 1) to dynamically determine the address of an internal function of interest by locating an exported reference (e.g., a system call having discoverable address) that calls an internal reference (e.g., an internal function) and passes it an exported reference (e.g., an exported global data having discoverable address) as a parameter in some examples of the present disclosure. Method 500 may be a variation of method 300. Method 500 begins in block 502.

In block 502, the third instrumentation locates a kernel exported system call or function in PE memory image 200 (FIG. 2-1) of guest kernel 112 (FIG. 1) in guest memory of a virtual machine. The third instrumentation parses the addresses of the NtSuspendProcess system call from the system call table in the PE memory image 200. The third instrumentation is also configured to parse the PsProcessType global data from the export table. Block 502 corresponds to block 302 of method 300. Block 502 may be followed by block 504.

In block 504, starting from the address of the NtSuspendProcess system call determined in block 502, the third instrumentation disassembles the machine code in the PE memory image 200 into assembly code. Block 504 corresponds to block 304 of method 300. Block 504 may be followed by block 506.

In block 506, the third instrumentation matches a pattern against memory references in the assembly code. As the third instrumentation disassembles the code of the NtSuspendProcess system call, it tracks what is loaded in the R8 register and looks for the address of the exported PsProcessType global data (determined in block 502) being loaded in the R8 register. When it detects the address of the exported PsProcessType global data is loaded in the R8 register, the third instrumentation looks for the next function call, which is a call to the ObpReferenceObjectByHandleWithTag internal function. When the third instrumentation detects the next function call, block 506 may be followed by block 508. Block 506 corresponds to block 306 of method 300.

In block 508, the third instrumentation determines the internal address information of guest kernel 112 from the assembly code. The third instrumentation parses the call destination of the next function call as the address of the ObpReferenceObjectByHandleWithTag internal function. Block 508 corresponds to block 308 of method 300.

Fourth Instrumentation

In some examples of the present disclosure, an instrumentation in VMI module 108 (FIG. 1) determines the address of an internal reference (e.g., internal global data) of interest by locating an exported reference (e.g., an exported function) that performs a specific instruction on the internal global data. For example, the internal global data may serve as a counter and the exported function increments the counter using an Interlocked operation that translate into a specific instruction in assembly code. Thus, the instrumentation discovers the address of the internal global data by locating the specific increment instruction in the exported function.

To demonstrate this instrumentation, consider the disassembled code the exported function "PsSetCreateThreadNotifyRoutine" for tracking the number of thread creation callbacks registered by kernel components listed in Table 3.

TABLE 3

PsSetCreateThreadNotifyRoutine

PsSetCreateThreadNotifyRoutine @14045cb00 of size 75
....
....
x14045cb4d: lock add dword ptr [PspCreateThreadNotifyRoutineCount] , 1
....
....

PsSetCreateThreadNotifyRoutine is an exported function so it is easily discovered in the PE memory image of guest kernel 112. "PspCreateThreadNotifyRoutineCount" is an internal global data that cannot be easily discovered in the PE memory image.

Figure 6:
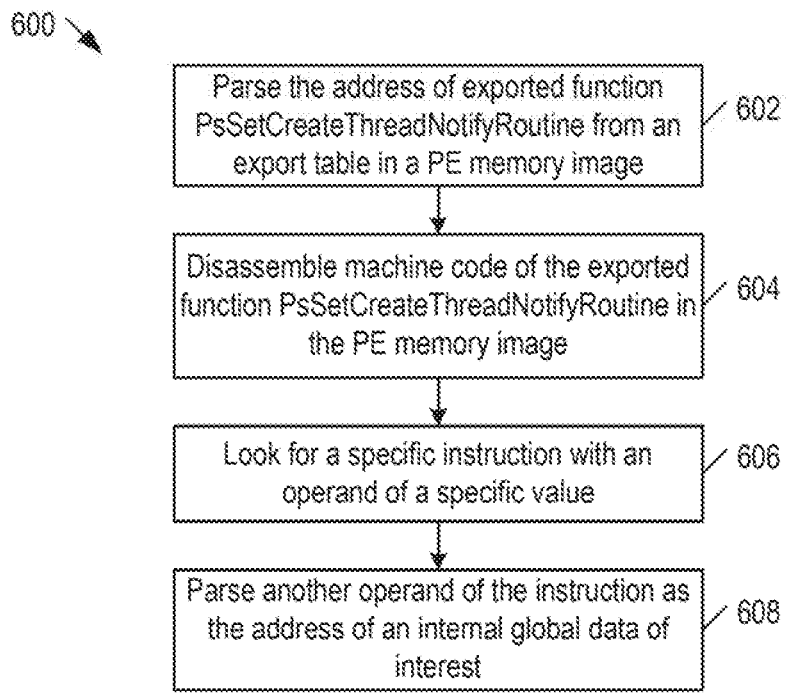
FIG. 6 is a block diagram illustrating a flowchart of a method for a fourth instrumentation in the VMI module of FIG. 1 to dynamically determine the address of an internal reference of interest by locating an exported reference that performs a specific instruction on the internal global data in some examples of the present disclosure.

A fourth instrumentation may be created to find the internal global data PspCreateThreadNotifyRoutineCount. FIG. 6 is a block diagram illustrating a flowchart of a method 600 for the fourth instrumentation in VMI module 108 (FIG. 1) to dynamically determine the address of an internal reference (e.g., internal global data) of interest by locating an exported reference (e.g., an exported function) that performs a specific instruction on the internal global data in some examples of the present disclosure. Method 600 may be a variation of method 300. Method 600 begins in block 602.

In block 602, the fourth instrumentation locates a kernel exported system call or function in PE memory image 200 (FIG. 2-1) of guest kernel 112 (FIG. 1) in guest memory of a virtual machine. The fourth instrumentation parses the addresses of the exported function PsSetCreateThreadNotifyRoutine from the export table in the PE memory image 200. Block 602 corresponds to block 302 of method 300. Block 602 may be followed by block 604.

In block 604, starting from the address of the exported function PsSetCreateThreadNotifyRoutine determined in block 602, the fourth instrumentation disassembles the machine code in the PE memory image 200 into assembly code. Block 604 corresponds to block 304 of method 300. Block 604 may be followed by block 606.

In block 606, the fourth instrumentation matches a pattern against memory references in the assembly code. As the fourth instrumentation disassembles the code of the exported function PsSetCreateThreadNotifyRoutine, it looks for a "lock add" instruction with a second operand of a constant "1." When the fourth instrumentation detects the instruction with the second operand of 1, block 606 may be followed by block 608. Block 606 corresponds to block 306 of method 300.

In block 608, the fourth instrumentation determines the internal address information of guest kernel 112 from the assembly code. The fourth instrumentation parses the first operand of the instruction, which provides the address of internal global data PspCreateThreadNotifyRoutineCount.

Fifth Instrumentation

Guest kernel 112 (FIG. 1) maintains internal data structures to capture information, such as a process's name, process ID (pid), parent pid, quotas, linked lists of threads. Guest kernel 112 provides a specific exported function that takes the pointer to the internal data structure (typically single parameter) and returns a field in the internal data structure. These are typically called Getter routines. Per the ABI of guest kernel 112, the function parameter (i.e., the pointer to the internal data structure) is passed via one register, and the exported function returns a value at a specific offset in the internal data structure via another register.

In some examples of the present disclosure, an instrumentation in VMI module 108 determines the offset of a field in an internal reference (e.g., an internal data structure) by locating an exported reference (e.g., an exported function) that returns a value at the offset in the internal data structure.

To demonstrate this instrumentation, consider the disassembled code the exported function "PsGetCurrentProcessId" for returning a pid of a process listed in Table 4.

TABLE 4

PsGetCurrentProcessId

PsGetCurrentProcessId (PEPROCESS process)
{
    mov rax, [rcx + 0x2E0]
    return rax
}

PsGetCurrentProcessId is an exported function so it is easily discovered in the PE memory image of guest kernel 112. "PEPROCESS" is an internal data structure that is dynamically created for each process in the system and its address is easily discovered in the PE memory image, such as find an exported function that can be called to get the current PEPROCESS (e.g., PsGetCurrentProcess).

Figure 7:
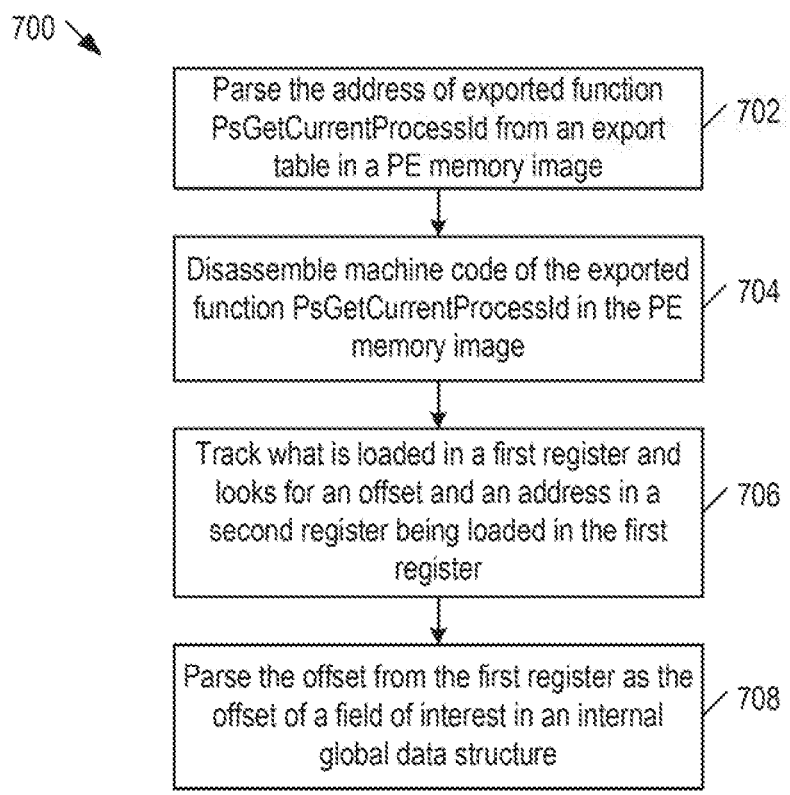
FIG. 7 is a block diagram illustrating a flowchart of a method for a fifth instrumentation in the VMI module of FIG. 1 to dynamically determine the offset of a field in an internal data structure by locating an exported reference that returns a value at the offset in the internal data structure in some examples of the present disclosure.

A fifth instrumentation may be created to find the offset of the pid field in the dynamically created internal data structure PEPROCESS. FIG. 7 is a block diagram illustrating a flowchart of a method 700 for the fifth instrumentation in VMI module 108 (FIG. 1) to dynamically determine the offset of a field in an internal reference (e.g., an internal data structure) by locating an exported reference (e.g., an exported function) that returns a value at the offset in the internal data structure in some examples of the present disclosure. Method 700 may be a specific implementation of method 300. Method 700 begins in block 702.

In block 702, the fifth instrumentation locates a kernel exported system call or exported function in PE memory image 200 (FIG. 2-1) of guest kernel 112 (FIG. 1) in guest memory of a virtual machine. The fifth instrumentation parses the addresses of the exported function PsGetCurrentProcessId from the export table in the PE memory image 200. Block 702 corresponds to block 302 of method 300. Block 702 may be followed by block 704.

In block 704, starting from the address of the exported function PsGetCurrentProcessId determined in block 702, the fifth instrumentation disassembles the machine code in the PE memory image 200 into assembly code. Block 704 corresponds to block 304 of method 300. Block 704 may be followed by block 706.

In block 706, the fifth instrumentation matches a pattern against memory references in the assembly code. As the fifth instrumentation disassembles the code of the exported function PsGetCurrentProcessId, it tracks what is being read relative to the RCX register and the relative offset is the offset of the field in the internal data structure. Block 706 may be followed by block 708. Block 706 corresponds to block 306 of method 300.

In block 708, the fifth instrumentation determines the internal address information of guest kernel 112 from the assembly code. The fifth instrumentation parses the offset relative to the RCX register, which provides the offset of the pid field in the internal global data structure PEPROCESS.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for a hypervisor to dynamically discover internal address information of a guest kernel on a virtual machine, the method comprising:
   locating, by the hypervisor, a kernel system call or an exported function in an image of the guest kernel in guest memory of the virtual machine based on parsing an export table comprising addresses associated with one or more exported functions or exported data in the image of the guest kernel to locate an address of the kernel system call or the exported function, wherein the guest memory corresponds to virtual memory allocated by the hypervisor;
   disassembling, by the hypervisor, machine code of the kernel system call or the exported function in the image into assembly code;
   detecting, by the hypervisor, a pattern from memory references in the assembly code, wherein the pattern includes at least one of:
      a call to a specific exported function with a first internal global data as a parameter for the specific exported function;
      a call to an internal function with a specific exported global data as a parameter for the internal function;
      a specific exported function returning a value at an offset in an internal data structure; and
      a specific instruction that operates on a second internal global data; and
   after detecting the pattern, determining, by the hypervisor, the internal address information of the guest kernel associated with the first internal global data, the internal function, the internal data structure, or the second internal global data from the assembly code.

2. The method of claim 1, wherein:
   for detecting the call to the specific exported function with the first internal global data as the parameter for the exported function, the internal address information comprises an address of the first internal global data.

3. The method of claim 2, further comprising tracking a register in the assembly code, wherein determining the internal address information of the guest kernel from the assembly code comprises looking up a value stored in the register after detecting the call to the specific exported function.

4. The method of claim 1, wherein:
   for detecting the call to the internal function with the specific exported global data as the parameter for the internal function, the internal address information comprises an address of the internal function.

5. The method of claim 4, further comprising tracking a register in the assembly code, wherein detecting the call comprises detecting an address of the specific exported global data being loaded in the register followed by the call to the internal function.

6. The method of claim 1, wherein:
   for detecting the specific exported function returning the value at the offset in the internal data structure, the internal address information comprises the offset of a field in the internal data structure.

7. The method of claim 6, wherein detecting the specific exported function returning the value at the offset in the internal data structure comprises detecting a value being read at a relative offset with respect to a specific register.

8. The method of claim 1, wherein:
   for detecting the specific instruction that operates on the second internal global data, the internal address information comprises an address of the second internal global data.

9. A non-transitory, computer-readable storage medium encoded with instructions executable by a processor to implement a hypervisor to dynamically discover internal address information of a guest kernel on a virtual machine, the instructions comprising:
   locating, by the hypervisor, a kernel system call or exported function in an image of the guest kernel in guest memory of the virtual machine based on parsing an export table comprising addresses associated with one or more exported functions or exported data in the image of the guest kernel to locate an address of the kernel system call or the exported function, wherein the guest memory corresponds to virtual memory allocated by the hypervisor;
   disassembling, by the hypervisor, machine code of the kernel system call or exported function in the image into assembly code;
   detecting, by the hypervisor, a pattern from memory references in the assembly code, wherein the pattern includes at least one of:

a call to a specific exported function with a first internal global data as a parameter for the specific exported function;
a call to an internal function with a specific exported global data as a parameter for the internal function;
a specific exported function returning a value at an offset in an internal data structure; and
a specific instruction that operates on a second internal global data; and
after detecting the pattern, determining, by the hypervisor, the internal address information of the guest kernel associated with the first internal global data, the internal function, the internal data structure, or the second internal global data from the assembly code.

10. The medium of claim 9, wherein:
for detecting the call to the specific exported function with the first internal global data as the parameter for the exported function, the internal address information comprises an address of the first internal global data.

11. The medium of claim 10, wherein:
the instructions further comprise tracking a register in the assembly code; and
determining the internal address information of the guest kernel from the assembly code comprises looking up a value stored in the register after detecting the call to the specific exported function.

12. The medium of claim 9, wherein:
for detecting the call to the internal function with the specific exported global data as the parameter for the internal function, the internal address information comprises an address of the internal function.

13. The medium of claim 12, wherein:
the instructions further comprise tracking a register in the assembly code; and
detecting the call comprises detecting an address of the specific exported global data being loaded in the register followed by the call to the internal function.

14. The medium of claim 9, wherein:
for detecting the specific exported function returning the value at the offset in the internal data structure, the internal address information comprises the offset of a field in the internal data structure.

15. The medium of claim 14, wherein detecting the specific exported function returning the value at the offset in the internal data structure comprises detecting a value being read at a relative offset with respect to a specific register.

16. The medium of claim 9, wherein:
for detecting the specific instruction that operates on the second internal global data, the internal address information comprises an address of the second internal global data.

17. A computer system, comprising:
a memory;
a secondary memory storing code for a hypervisor;
a processor configured to load the code from the secondary memory to main memory and execute the code to:
locate, by the hypervisor, a kernel system call or exported function in an image of a guest kernel in memory of a virtual machine based on parsing an export table comprising addresses associated with one or more exported functions or exported data in the image of the guest kernel to locate an address of the kernel system call or the exported function, wherein the memory corresponds to virtual memory allocated by the hypervisor;
disassemble, by the hypervisor, machine code of the kernel system call or exported function in the image into assembly code;
detect, by the hypervisor, a pattern from memory references in the assembly code, wherein the pattern includes at least one of:
a call to a specific exported function with a first internal global data as a parameter for the specific exported function;
a call to an internal function with a specific exported global data as a parameter for the internal function;
a specific exported function returning a value at an offset in an internal data structure; and
a specific instruction that operates on a second internal global data; and
after detecting the pattern, determine, by the hypervisor, the internal address information of the guest kernel associated with the first internal global data, the internal function, the internal data structure, or the second internal global data from the assembly code.

18. The system of claim 17, wherein:
for detecting the call to the specific exported function with the first internal global data as the parameter for the exported function, the internal address information comprises an address of the first internal global data.

19. The system of claim 18, wherein the processor is further configured to execute the code to track a register in the assembly code; and
wherein determine the internal address information of the guest kernel from the assembly code comprising looking up a value stored in the register after detecting the call to the specific exported function.

20. The system of claim 17, wherein:
for detecting the call to the internal function with the specific exported global data as the parameter for the internal function, the internal address information comprises an address of the internal function.

21. The system of claim 20, wherein the processor is further configured to track a register in the assembly code; and
wherein detect the call comprises detecting an address of the specific exported global data being loaded in the register followed by the call to the internal function.

22. The system of claim 17, wherein:
for detecting the specific exported function returning the value at the offset in the internal data structure, the internal address information comprises the offset of a field in the internal data structure.

23. The system of claim 22, wherein detect the specific exported function returning the value at the offset in the internal data structure comprises detecting a value being read at a relative offset with respect to a specific register.

24. The system of claim 17, wherein:
for detecting the specific instruction that operates on the second internal global data, the internal address information comprises an address of the second internal global data.

* * * * *